Aug. 13, 1968  R. H. FEHNER  3,397,073
SOOT-RESISTANT ROOFING GRANULES
Filed Dec. 11, 1963
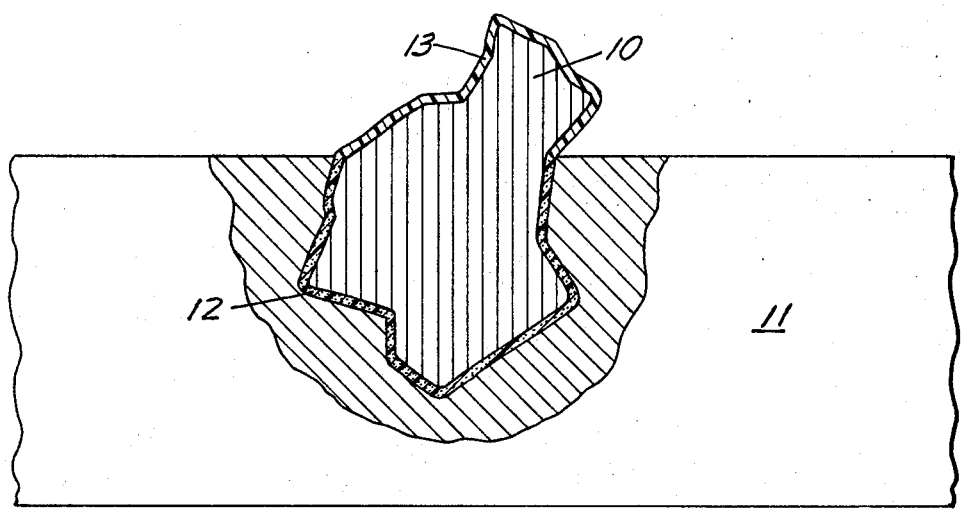
INVENTOR.
ROBERT H. FEHNER
BY
Carpenter, Abbott, Coulter & Kinney
ATTORNEYS ＃ 3,397,073
SOOT-RESISTANT ROOFING GRANULES
Robert H. Fehner, St. Paul, Minn., assignor to Minnesota Mining and Manufacturing Company, St. Paul, Minn., a corporation of Delaware
Filed Dec. 11, 1963, Ser. No. 329,784
5 Claims. (Cl. 117—27)

ABSTRACT OF THE DISCLOSURE

A new article of manufacture, a substrate, for example a mineral granule, treated or coated with an organophilic-hydrophobic organo-silicon compound characterized in that it becomes hydrophilic upon exposure to ultraviolet light. Color-coated roofing granules so treated form a firm bond in a bituminous roofing product, facilitated by the initial organophilic-hydrophobic character thereof. Upon exposure of the granule to sunlight and air, the visible portion of the granule changes to a hydrophilic character rendering it readily wet by water, thus permitting discoloring soot, dirt, and air pollutants to be easily washed away.

---

The present invention is concerned with the provision of artifically colored mineral granules, suitable for use in bituminous roofing compositions, which exhibit resistance to discoloration when exposed to the air and to the elements, including soot, dirt, etc. More particularly, my invention provides a granule having a surface treatment which, in portions of the granule exposed to the elements and to the air when in place in bituminous roofing compositions, becomes hydrophilic (water-wettable) due to degradation of the treatment in such areas.

Artificially colored roofing granules are conventionally manufactured by coating mineral granules of desired size with pigmented aqueous alkali silicate compositions, followed by drying and insolubilizing the silicate binder. Treatments of the thus color coated granules have been generally employed to render the normally hydrophilic silicate surface of the granule oleophilic to promote firm adhesion between the granule and the asphalt coated sheet into which the granules are partially embedded.

Such treatments have taken numerous forms. For example, see Keene et al. Patent No. 2,595,465 granted May 6, 1952, on application filed Nov. 24, 1944, which concerns a provision of organophilic surfaces on normally hydrophilic inorganic or mineral granules, by employing treatments of various organo-silicon compounds. The teaching of the Keene et al. patent has seen wide commercial use, and has provided treated color coated roofing granules which will form, and do form, a firm bond in bituminous roofing. However, notwithstanding their wide use, granules made in accordance with the Keene et al. patent do exhibit certain drawbacks when considered in relation to the more demanding standards which current roofing granules must meet. Thus treatments with organosilicon compounds disclosed by Keene et al. yield granules which are subject to oil-discoloration from dark colored oils absorbed from the underlying bitumen, particularly prior to permanent installation of the roofing. (This is a problem discussed generally in Olsen et al. Patent No. 3,013,893, granted Dec. 19, 1961, on parent application filed Apr. 6, 1956.) Also, the organo-silicon compounds disclosed by Keene et al., which accomplish the objectives therein stated in conventional processes, yield a surface on granules treated therewith which is receptive to soot, dirt, pollutants, etc. which the granules encounter after installation of the roofing on buildings, particularly in industrial areas. Some are more receptive to soiling than others, but all yield granules which are receptive to soiling with soot, dirt, pollutants, etc.

While the tendency of sooting can be minimized by employing no post-treatment on color coated roofing granules, the desirability of improved adhesion to the asphalt roofing has been considered to necessitate the use of post-treatments in the commercial manufacture of roofing granules. In turn this, unfortunately, has required a tolerance of the increased tendency of granules to sooting.

Insofar as I am aware, no one heretofore has provided a roofing granule which, in the areas thereof contacting the bituminous roofing in which situated, has essentially an organophilic and hydrophobic (water repellent) surface (to promote firm bonding), and which, in the remaining areas (open to view) exhibits a surface which is readily wettable by water shortly after exposure to the elements. The present invention is directed to the provision of such a granule product.

In accordance with my invention, I provide roofing granules which are treated with an organophilic organo-silicon compound, preferably an organophilic and hydrophobic compound, which is readily susceptible to degradation upon exposure to sunlight and the elements (i.e., to ultraviolet light and oxygen), and becomes hydrophilic in the degraded state.

With reference to the accompanying enlarged schematic drawing illustrating roofing granules 10 partially embedded in a bituminous composition 11, the portion 12 of the granule in contact with the bituminous composition 11 contains a surface treatment or coating which is highly organophilic and hydrophobic. The treatment forms a firm bond on the surface of the granule, and also firmly adheres to the bituminous composition. Following exposure of the granule to the sun and the elements for a few days or weeks, the surface treatment in area 13 of the granule, which is exposed to the air, has become hydrophilic and water receptive, due to degradation of the treating material. Being hydrophilic, the exposed portions 13 are readily wet by rain or moisture otherwise provided so that any soot or dirt, or the like, deposited on the granule surface is readily washed away, yielding a color coated surface exhibiting a color density substantially undiminished over its initial state.

Although in the drawing the treatment is shown as having a finite thickness, and as being continuous, in reality the treatment is extremely thin, and probably is not completely continuous. In the exposed portions of the granule where the treating material has undergone degradation, the treatment may be diminished over its initial thickness, or in some instances at least partially removed. Where the treating material is a preferred organi-silicon material such as vinylmethoxypolysiloxane, the degradation product is probably an oxidized siloxane, the vinyl groups being fugitive, and the silicon atoms being bonded either physically or chemically, or both, into the siliceous surface of the color coated granule.

Having now described my invention in a general way, the same will now be specifically illustrated with the aid of the following non-limiting examples.

Example I

A white color coated granule is first prepared as follows. A precoat composition is prepared in accordance with the following formulation.

| Constituents: | Pounds |
|---|---|
| $TiO_2$ | 15 |
| Kaolin | 50 |
| "K" Brand aqueous sodium silicate (42.9% solids) ($Na_2O:SiO_2$ ratio equals 1:2.9) | 62 |
| Water | 24 |

The ingredients of the coating composition are first mixed together, following which the composition is applied to 2,000 pounds of #11 grade mineral granules, for example grey-stone granules, in a tumbling barrel-type mixer. The coating is then pre-dried, by passing air through the mixer, until the coated granules are free-flowing, all in accordance with conventional practice, after which the granules are transferred to a rotary kiln and fired at 950° F., dwell time in the kiln being about 20 minutes. The granules are then cooled in a rotary cooler by means of a water spray.

A second coating composition is prepared by mixing ingredients in accordance with the following formulation:

| Constituents: | Pounds |
| --- | --- |
| TiO$_2$ | 15 |
| Kaolin | 10 |
| K Brand aqueous sodium silicate (42.9% solids) | 62 |
| Water | 25 |

The second coating composition is applied to the cooled precoated granules, following which the granules are fired in a rotary kiln at 950° F. to insolubilize the coating. The granules are again cooled by a water spray.

Then, a fine emulsion of vinylmethoxypolysiloxane in slate oil is added to the granules in the rotary cooler at the level of about five pounds of emulsion per 2,000 pounds of granules. The vinylmethoxypolysiloxane, obtained from General Electric Company under the designation CR 105, had the approximate formula:

$$(CH_2=CH)Si(OCH_3)_{0.22}O_{1.39}$$

Specifically, the emulsion consists of 4.8 parts by weight of a solution of 70 weight percent of the vinylmethoxypolysiloxane and 30% "Solvesso 100" aromatic hydrocarbon solvent (said solution having a viscosity of 25–45 centipoises at 25° C.) finely dispersed in 95.2 parts of slate oil (No. 635 oil obtained from the Texas Co.).

Following removal from the rotary cooler, the completed granules are ready for use in manufacture of granule surface-coated bituminous roofing.

Adhesion of granules prepared according to this example to bituminous roofing has been found to be excellent. The tendency of the granules to stain during storage of the roofing prior to installation was, at most, very slight.

Reflectance values of the freshly manufactured roofing were obtained with a "Photovolt" reflectometer. Thereafter the roofing was installed in a smoky atmosphere such as is found in industrial areas in southeastern Pennsylvania, and periodic reflectance values were taken. Following installation in the month of December, the reflectance value of the roofing was seen to drop by more than 11% from its initial value by the following March. Thereafter, the reflectance rose nearly back to the initial value, indicating that soot, dirt, and pollutants deposited on the granule surfacing during the dry winter months had been removed. On the other hand, "control" samples of roofing surfaces containing like color-coated granules (except which had been treated with a heretofore commercially employed organophilic adhesion promoting treatment) showed a corresponding initial reflectance in December, but upon identical exposure conditions to those employed in the present example, the reflectance dropped nearly 20% by the following March, with no substantial rise during the ensuing months.

The following example illustrates application of my invention to high temperature single coated red granules.

Example II

| Constituents: | Pounds |
| --- | --- |
| Red iron oxide pigment | 15 |
| Kaolin | 20 |
| "K" Brand Sodium Silicate (42.9% solids, Na$_2$O:SiO$_2$ ratio of 1:2.9) | 45 |
| Water | 25 |

The ingredients of the coating composition were first mixed together and applied to 2,000 pounds of No. 11 grade (minus 10, plus 35 mesh) mineral granules as in Example I. The color-coated granules were fired to about 950° F. to insolubilize the coating. The resulting granules were cooled in a rotary cooler with a water spray which contains a treating material of aqueous sodium vinyl siliconate solution of approximate formula $$CH_2=CH-Si(OH)_2ONa$$

containing 20% solids at CH$_2$=CH—SiO$_{1.5}$ so that a quantity of 0.5 pound of the solution is applied to 2,000 pounds of granules. This treatment was followed by the application of about five pounds of slate oil on 2,000 pounds of granules.

These granules exhibited an excellent adhesion to bituminous roofing. Little or no difficulty in oil discoloration prior to installation resulted. Also, the bituminous roofing surfaced therewith exhibited excellent resistance to staining or discoloration by soot, dirt, dust, etc. That is, soot, dust, etc. accumulating during dry periods was easily washed away.

The following example illustrates the application of the present invention to a low temperature fired green granule.

Example III

A granule coating composition is prepared as before with the following composition.

| Constituents: | Pounds |
| --- | --- |
| Chromium oxide | 8 |
| Yellow iron oxide | 1.5 |
| Phthalocyanine green paste (20% solids) | 2.0 |
| "K" Brand Sodium Silicate (42.9% solids, Na$_2$O:SiO$_2$ ratio of 1:2.9) | 32 |
| Water | 7 |

The ingredients of the coating composition are first mixed together and applied to 2,000 pounds of No. 11 grade (minus 10, plus 35 mesh) mineral granules as in Example I. In this example, the color coated granules are fired to 375° F. to essentially dehydrate the coating and then sprayed with a solution of hydrochloric acid and aluminum chloride to neutralize the sodium silicate. The granules are then sprayed with a solution of the following composition:

| | Percent |
| --- | --- |
| Vinyltriethoxysilane | 9 |
| Slate oil | 91 |

About five pounds of this solution is applied to 2,000 pounds of color coated and neutralized granules.

When applied as surfacing to bituminous roofing composition, firmly adherent soot resistant granules result.

While the preceding examples illustrate the types of treating materials which I prefer to use, in general I find compounds to be useful which are or become highly organophilic and hydrophobic on application to some suitable substrate, and which, upon exposure to sunlight and the air, degrade to a hydrophilic state. In particular, I have found those organic compounds of silicon are preferred which are derivatives of silane, SiH$_4$, in which at least one of the hydrogens is replaced by an easily-weathered (i.e. susceptible to degradation upon exposure to sunlight and air) higher alkyl, alkene, alkyne, etc. group and at least one hydrogen remains or is replaced by a hydroxy or an easily hydrolyzable group.

In respect to the "easily weathered" group, the unsaturated groups, such as vinyl, dichlorovinyl, allyl, higher olefins and their derivatives are preferred. Also of use are acetylenic groups, including those containing bromine as a result of their preparation. Further easily weather-degradable groups are those containing ether linkages, such as alkoxymethyl or the like. Of interest also are easily weathered groups in which some or all of the hydrogen atoms have been replaced with fluorine. Also of use are the reaction products of certain alkyd resins with various silicon compounds such as diphenylsilanediol.

Easily hydrolyzable groups which can replace the hydrogen in useful silane derivatives include halogen, carboxy, alkoxy, aryloxy, amino, ether-alkoxy, ether-aryloxy, and similar groups.

Exemplary treating materials which are derivatives of silane and contain the "easily weathered" group and hydrogen or a hydrolyzable group, include simple compounds or polymers which are obtained by partial or complete intra or interpolymerization of such derivatives with two or more easily hydrolyzable groups, or metal salts of hydrolyzates of materials above-mentioned. We prefer the vinylsilicon compounds, such as vinylmethoxypolysiloxane, sodium vinyl siliconate, vinyl triethoxysilane, vinyltris (2-chloroethoxy) silane, and various copolymers of alkoxy silanes. Certain silicon-alkyd copolymers also are useful, such as "Sylkyd 1400," available from Dow-Corning.

What I claim is as follows:

1. A mineral granule characterized by resistance to discoloration by soot, dirt, and pollutants in the air upon exposure to sunlight in the air, said mineral granule having a surface treament of an organophilic and hydrophobic organosilicon compound in which the silicon is bonded to:
   (a) at least one monovalent substituent selected from the class consisting of a hydroxy group and an easily hydrolyzable group; and
   (b) a monovalent organic substituent susceptible to degradation upon exposure to sunlight in the air, said organic substituent having aliphatic carbon-carbon unsaturation.

2. A mineral granule characterized by resistance to discoloration by soot, dirt, and pollutants in the air upon exposure to sunlight in the air, said mineral granule comprising a base mineral granule having a well bonded color coating over the surface thereof, and over said color coating a treatment of an organophilic and hydrophobic organosilicon compound in which the silicon is bonded to:
   (a) at least one monovalent substitutent selected from the class consisting of a hydroxy group and an easily hydrolyzable group; and
   (b) a monovalent organic substituent susceptible to degradation upon exposure to sunlight in the air, said organic substituent having aliphatic carbon-carbon unsaturation.

3. A mineral granule characterized by resistance to discoloration by soot, dirt, and pollutants in the air upon exposure to sunlight in the air, said mineral granule comprising a base mineral granule having a well bonded color coating over the surface thereof, and over said color coating a treatment of an organophilic and hydrophobic organosilicon compound in which the silicon is bonded to:
   (a) at least one monovalent substituent selected from the class consisting of a hydroxy group and an easily hydrolyzable group; and
   (b) a vinyl group.

4. A mineral granule characterized by resistance to discoloration by soot, dirt, and pollutants in the air upon exposure to sunlight in the air, said mineral granule comprising a base mineral granule having a well bonded color coating over the surface thereof, and over said color coating a treatment of a vinylmethoxypolysiloxane.

5. A mineral granule characterized by resistance to discoloration by soot, dirt, and pollutants in the air upon exposure to sunlight in the air, said mineral granule comprising a base minueral granule having a well bonded color coating over the surface thereof, and over said color coating a treatment of vinyltriethoxysilane.

References Cited

UNITED STATES PATENTS

| | | | |
|---|---|---|---|
| 2,595,465 | 5/1952 | Keene et al. | 117—100 X |
| 2,724,659 | 11/1955 | Jobbins et al. | 117—27 X |
| 2,891,885 | 6/1959 | Brooks | 117—124 |
| 2,927,045 | 3/1960 | Lodge et al. | 117—27 X |
| 3,013,893 | 12/1961 | Olson et al. | 117—32 X |
| 3,208,871 | 9/1965 | Langset et al. | 117—27 |
| 3,123,495 | 3/1964 | Carpenter et al. | 117—27 |

WILLIAM D. MARTIN, *Primary Examiner.*

T. G. DAVIS, *Assistant Examiner.*